Sept. 17, 1963   C. E. ORTMAN, JR   3,103,736
CUTTING TOOL AND MILLING HEAD INSERT THEREFOR
Filed May 11, 1959
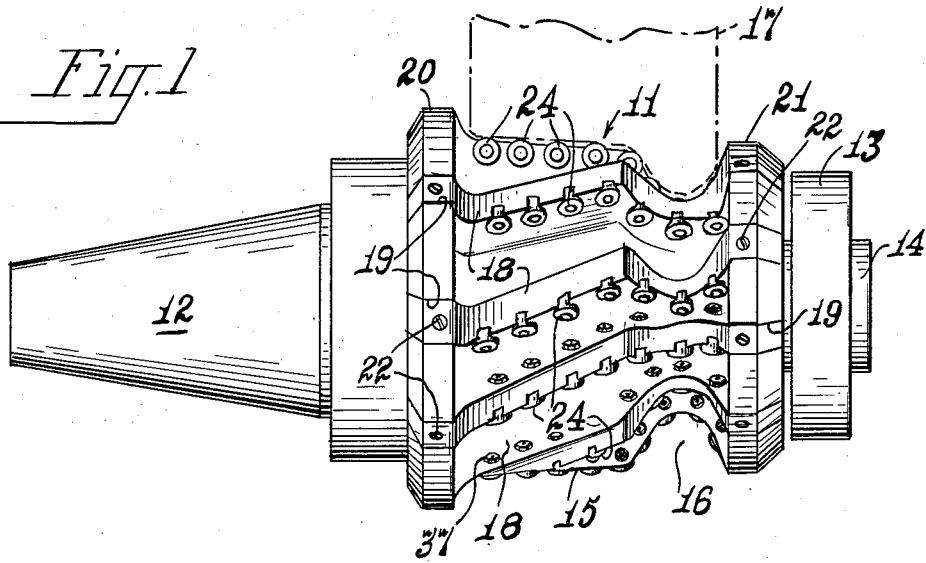
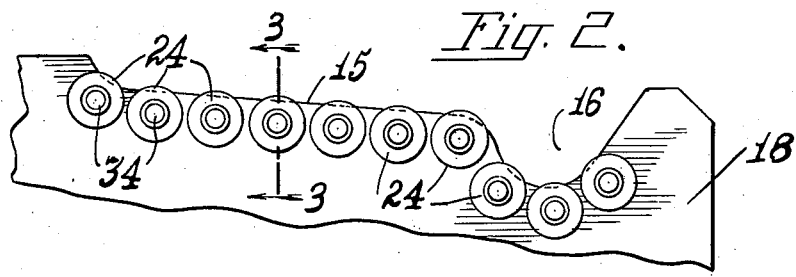
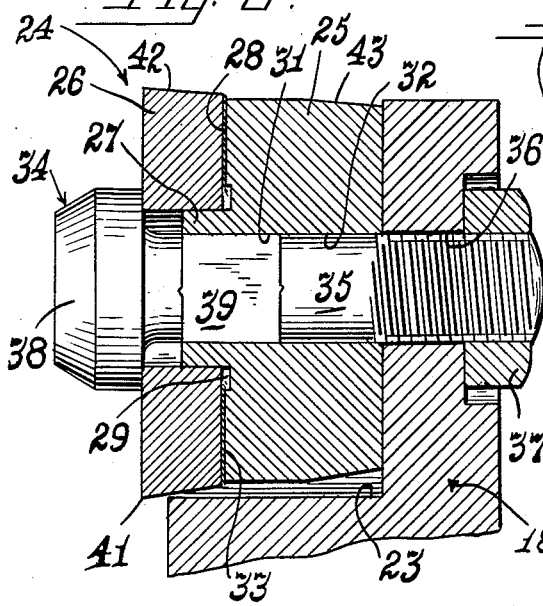
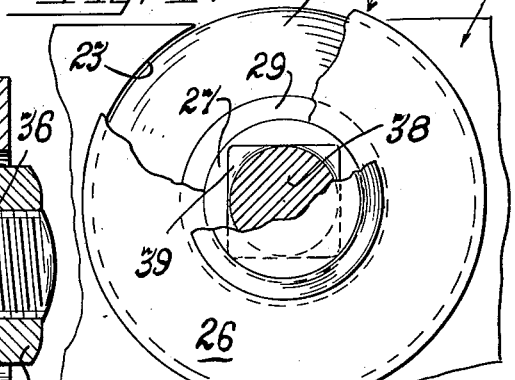
INVENTOR.
Charles E. Ortman, Jr.

3,103,736
CUTTING TOOL AND MILLING HEAD
INSERT THEREFOR
Charles Edward Ortman, Jr., Bannockburn, Ill., assignor to Stanray Corporation, a corporation of Delaware
Filed May 11, 1959, Ser. No. 812,320
2 Claims. (Cl. 29—96)

The invention relates to improvements in a milling type cutter of a character that is used in truing metal wheels of the type used on vehicles that operate on metal tracks. Railway locomotive and cars are equipped with wheels having tread and flange portions that engage and move along rails. The tread and flange portions of the wheel are subjected to wear that results in surface damage and impairment of the riding quality of the car or locomotive. Because the wear is uneven, the wheels become marred and lose their roundness and must be restored to their required concentricity.

The present invention is concerned with the cutting elements, which may be used in other applications and environments, but which for purposes of convenience and disclosure are arranged in large numbers on a cutter of a type shown in Patent No. 2,645,003, issued July 14, 1953, and intended for use in truing vehicle wheels. These cutting elements preferably are circular in outline but they may be in the shape of an octagon, hexagon, or square, in which instances their cutting edges will be straight rather than circular as shown herein. Each cutting element is adjustably mounted so as to be indexed easily, quickly and accurately for the purpose of presenting a new cutting edge to the work when a used edge becomes worn. However, because of their construction they are expensive.

Specifically, the cutting element of the present invention comprises two basic parts integrally joined together as by brazing and arranged to be mounted on a cutter plate by means of a lock bolt or stud having a squared area to fit a square axial opening in the element. One of these parts comprises a stress proof steel shank or body of material thickness having flat faces, one of which has an axial boss thereon. The other part comprises the cutter element and this is comprised of a wafer of tungsten carbide, or other equally useful abrading material centrally apertured to receive the boss therein when the elements are fitted together in face to face relation. In order to braze the parts one to the other to form a unitary whole a brazing washer is arranged between the elements during assembly. When brazed, any surplus material from the washer is accommodated in an annular recess formed in the face of the body around the boss. The resulting assembly resists forces tending to separate the parts under operating stress. Both parts, as well as the head of the lock bolt, have tapered perimeter faces so as to insure free flow of ship particles without clogging.

It is therefore an object of the present invention to provide a cutter with novelly constructed cutting elements.

Another object is to provide a novel two piece cutting element.

Another object is to provide a cutting element of the character described which includes a carbide unit fused, brazed or otherwise integrally secured to a metal backing or base unit.

Another object is to provide a laminated cutting element of a character that resists breakage.

Another object is to provide cutting elements or buttons that are not difficult or expensive to manufacture and assemble, are easy to mount on a cutter body or plate, are easily and accurately adjusted, easy to replace and very efficient and economical in use.

The structure by means of which the above noted and other advantages of the invention are attained will be described in the following specification, taken in conjunction with the accompanying drawings, showing a preferred illustrative embodiment of the invention, in which:

FIG. 1 is an elevational view of one embodiment of a rotary cutter having the novel cutting elements mounted thereon.

FIG. 2 is an enlarged, side elevational view of one of the removable plates or cutter bodies having improved cutting elements thereon.

FIG. 3 is an enlarged detail sectional view taken on line 3—3 of FIG. 2.

FIG. 4 is an elevational view of the cutting element shown in FIG. 3, showing it mounted and parts broken away to illustrate details thereof.

Referring to the representative illustration in FIGS. 1 and 2 of one form of application of the cutting elements embodying the present invention, the cutter there shown is useful particularly in performing milling operations on the tread and flange portions of a railroad vehicle wheel. The cutter comprises a cutter head portion and an arbor portion 12. The arbor portion is adapted to be fitted into a conventional chuck (not shown) of a milling or truing machine suitable for the disclosed operation, and a bearing 13 is mounted on a shaft portion 14. The cutter head portion 11 is generally circular in cross section and it is provided with a peripheral contour in a longitudinal direction that includes a relatively flat portion 15 that corresponds with the tread of a wheel 17 and a valley portion 16 that corresponds to the flange portion of the wheel. Circumferentially, the cutter has spaced webs or ribs formed by recessing the circumferential face between the ribs or by mounting thereon a series of annularly spaced plates 18 of the character best illustrated in FIG. 2. These plates may be secured at their ends in recesses or seats 19 formed in end flanges 20–21 of the cutter head portion 11 as by means of screws 22. Irrespective of whether the cutter head portion 11 is formed with ribs or webs or is fitted with plates 18, the margin of the outer or conformed edge of each rib or plate is formed with a series of recesses or socket-like apertures 23. These recesses extend part of the way through the plate from the leading face thereof. The recesses are spaced inwardly from the outer conformed edge of the plate a distance sufficient to open onto the outer edge for a purpose to become apparent presently.

As best shown in FIGS. 3 and 4 each recess 23 is adapted to receive mounted therein a novel cutting element or button 24. The recesses on adjacent ribs or plates are staggered or offset one from the other to effect uniform grinding of the vehicle wheel surfaces. Each cutting element is comprised of a body or shank portion 25 and a grinding or cutter portion 26 integrally joined together in face to face relation. The shank portion 25 preferably is comprised of any suitable base metal such as steel suitably machined to provide an axial boss 27 on one face 28 thereof and a surrounding recess 29 on said face. A substantially square or other non-circular axial opening 31 is formed in said shank portion 25 and merges with a circular base 32.

Mounted on the recessed face 28 firmly, is the cutter element or wafer 26 of tungsten carbide. This wafer is of substantially the same diameter as the steel shank portion 25 and it is suitably bored or apertured to receive the shank boss 27 snugly. Prior to mounting the carbide wafer on the steel shank portion, there is arranged between them a brazing washer 33 which serves to braze the two parts and form a unitary whole capable of resisting carbide breakage. Surplus brazing material from the fused washer flows into the annular recess 29 thus insuring flat face to face contact.

The cutter elements 24 are arranged one in each recess 23 and each is secured in place by a lock bolt 34 which comprises a stem 35 which is extended through an aperture 36 in plate 18, and is externally threaded at its free end to receive thereon a lock nut 37. The other end of the said stem has a head 38 that is carried into tight binding engagement with the outside face of carbide wafer 26 when the lock bolt is tightened. Stem 35 has a non-circular or squared portion 39 that seats in the non-circular aperture 31 in the cutter element.

The cutter element 24 may have an overall thickness slightly greater than the depth of the recess 23 in which it is seated, as shown, so that its cutting edge 41 adjacent the leading face of said cutter plate 18 lies outside the plane of said face or it may be substantially flush therewith. Owing to the possibility of the cutter element becoming clogged with chip particles, the circumferential surface 42 of the cutter wafer 26 is tapered inwardly rearwardly from its major diameter which is that of the cutting edge 41 and which corresponds substantially to the diameter of said recess, as best shown in FIG. 3. At least a portion of the width of the circumferential surface of the base metal shank portion 25 also is tapered rearwardly, as at 43, in substantial continuation of the taper of said cutter wafer. Such an arrangement provides a progressively widening annular space about the wafer 26 which serves to prevent any substantial waste accumulation in recess 23.

Cutter elements 24 are intended to be adjusted rotatably in their mounting so that when the segment of the cutting edge 41 exposed to the work becomes worn, the cutter element can be rotated sufficiently to present a new cutting edge segment to the work. Such adjustment, accurately, can be effected easily and quickly by loosening the lock nut 37, rotating the cutter element to present a new cutting edge, and then re-tightening the lock nut.

Because of the laminated structure of the cutter elements, the cost of such elements as compared with one piece carbide elements used heretofore is materially reduced. Further, a metal backed carbide cutter wafer is less rigid and less likely to break, thus minimizing the costs of maintaining the milling machine in condition for efficient operation.

Although I have described a preferred embodiment of my invention in considerable detail, it will be understood that the description thereof is intended to be illustrative, rather than restrictive, as details of the structure shown may be modified or changed without departing from the spirit or scope of the invention. Accordingly, I do not desire to be restricted to the exact construction described.

I claim:

1. A cutter including a mounting plate disposed to provide a leading face and having a substantially cylindrical recess opening through said face and extending relatively rearwardly therefrom and also peripherally opening onto one edge thereof and a cutting element mounted in set back relation within said recess, said cutting element comprising a circular shank of base material seated on the bottom of said recess, an axial apertured circular cutting disc of carbide material brazed on one face of said shank, an axial boss on said one face of the shank which extends into the axially apertured cutting disc, the boss being of less length than the thickness of said cutting disc and said boss and shank having an axial opening therethrough at least a part of which is non-circular, an annular recess on said one face of the shank surrounding the boss to receive surplus brazing material, said cutting disc having its circumferential surface tapered inwardly-rearwardly from its outside face to provide a peripheral relieved cutting edge at the periphery of said outside face, at least a portion of the circumferential surface of said shank being also tapered inwardly-rearwardly in substantial continuation of the taper of the cutting disc, the major diameter of the cutting disc at said peripheral cutting edge corresponding substantially to the diameter of said circular recess and the minor diameter of the shank portion being appreciably less than said recess diameter, whereby to provide an annular space between the recess side wall and said cutting element which has width that increases toward the recess bottom thus to prevent any substantial waste accumulation in said recess, and a stud including a head seated on the outside face of the cutting disc and a stem extending through the axial opening and secured to said mounting plate to retain the cutting element in the recess.

2. A cutter including a mounting plate disposed to provide a leading face and having a substantially cylindrical recess opening through said face and extending relatively rearwardly therefrom and also peripherally opening onto one edge thereof and a cutting element seated in said recess, said cutting element comprising a circular body of a thickness slightly greater than the depth of the recess and being substantially enclosed within and having its rearward end seated against the bottom of said recess, an axial opening in said cutting element, said cutting element having its circumferential surface tapered inwardly-rearwardly from its outside face to provide a relieved cutting edge at the periphery of said outside face, the major diameter of the cutting element at said peripheral cutting edge corresponding substantially to the diameter of said recess and its minor rearward diameter being appreciably less than said recess diameter, whereby to provide a generally annular space between the recess side wall and the cutting element which has width that increases towards the recess bottom thus to prevent waste accumulation in said recess, and a stud including a head seated on the outside face of the cutting element and a stem extending through the axial opening and secured to the mounting plate to retain the cutting element in the recess.

References Cited in the file of this patent

UNITED STATES PATENTS

| | | |
|---|---|---|
| 1,797,026 | Sharp | Mar. 17, 1931 |
| 1,887,372 | Emmons | Nov. 8, 1932 |
| 2,130,684 | Hintermeyer | Sept. 20, 1938 |
| 2,208,892 | Bukacek | July 23, 1940 |
| 2,289,344 | Cedarleaf | July 14, 1942 |
| 2,334,755 | Eglington | Nov. 23, 1943 |
| 2,598,581 | McKenna | May 27, 1952 |
| 2,641,048 | Vreeland | June 9, 1953 |
| 2,645,003 | Thompson | July 14, 1953 |
| 2,664,617 | Kralowetz | Jan. 5, 1954 |
| 2,674,028 | Kontra | Apr. 6, 1954 |
| 2,877,535 | Williams | Mar. 17, 1959 |
| 2,899,738 | Almen | Aug. 18, 1959 |

FOREIGN PATENTS

| | | |
|---|---|---|
| 379,047 | Great Britain | Aug. 25, 1932 |
| 498,397 | Belgium | Jan. 15, 1951 |
| 671,005 | Great Britain | Apr. 30, 1952 |
| 795,993 | Great Britain | June 4, 1958 |
| 843,636 | France | Apr. 3, 1939 |
| 1,024,730 | France | Jan. 10, 1953 |
| 1,047,059 | France | July 15, 1953 |
| 1,125,043 | France | July 9, 1956 |